US012591761B2

(12) United States Patent
Zhang et al.

(10) Patent No.: US 12,591,761 B2
(45) Date of Patent: Mar. 31, 2026

(54) EXECUTION OF TRAINED NEURAL NETWORKS USING A DATABASE SYSTEM

(71) Applicant: SHAPE SECURITY, INC., Mountain View, CA (US)

(72) Inventors: Bei Zhang, San Jose, CA (US); Samir Shah, San Francisco, CA (US); Kenton Miller, Sunnyvale, CA (US)

(73) Assignee: SHAPE SECURITY, INC., Seattle, WA (US)

( * ) Notice: Subject to any disclaimer, the term of this patent is extended or adjusted under 35 U.S.C. 154(b) by 1107 days.

(21) Appl. No.: 16/211,138

(22) Filed: Dec. 5, 2018

(65) Prior Publication Data

US 2020/0184311 A1      Jun. 11, 2020

(51) Int. Cl.
*G06N 3/042* (2023.01)
*G06F 16/2457* (2019.01)
*G06F 16/2458* (2019.01)
*G06N 3/08* (2023.01)

(52) U.S. Cl.
CPC ....... *G06N 3/042* (2023.01); *G06F 16/24578* (2019.01); *G06F 16/2458* (2019.01); *G06N 3/08* (2013.01)

(58) Field of Classification Search
CPC .......... G06N 3/08; G06N 3/042; G06N 3/048; G06N 3/063; G06F 16/24578; G06F 16/2458
See application file for complete search history.

(56) References Cited

U.S. PATENT DOCUMENTS

| | | | |
|---|---|---|---|
| 6,108,648 A | 8/2000 | Lakshmi et al. |
| 10,733,320 B2 | 8/2020 | Nerurkar |
| 11,061,902 B2 | 7/2021 | Idicula |
| | (Continued) | |

OTHER PUBLICATIONS

Imani, Mohsen et al. "RapidInn: In-memory Deep Neural Network Acceleration Framework" arXiv [Version 3 published 2018] [ Retrieved Apr. 2022] <URL:https://arxiv.org/abs/1806.05794> (Year: 2018).*

(Continued)

*Primary Examiner* — Leonard A Sieger
(74) *Attorney, Agent, or Firm* — Troutman Pepper Locke LLP

(57) ABSTRACT

In an embodiment, a computer-implemented method for efficient execution of a trained neural network using a database system, the trained neural network comprising a plurality of layers each comprising weight values and bias values and programmed at each of the layers to execute an affine transformation of an activation function and an input value, comprises: for a particular layer of the trained neural network, dividing the affine transformation input a plurality of transformation pieces; executing each of the transformation pieces to result in computed pieces and writing the computed pieces to a first database table; using one or more database queries, combining the computed pieces and applying the activation function to generate a set of output data; writing the output data to one of a plurality of different second database tables that respectively correspond to the layers; repeating the dividing, executing, combining, applying and writing for all layers of the trained neural network.

20 Claims, 4 Drawing Sheets

(56) References Cited

U.S. PATENT DOCUMENTS

| | | | | |
|---|---|---|---|---|
| 2002/0120435 | A1* | 8/2002 | Frazier | G06N 3/105 |
| | | | | 704/1 |
| 2006/0003419 | A1 | 1/2006 | Pan et al. | |
| 2006/0034194 | A1 | 2/2006 | Kahan | |
| 2006/0230006 | A1 | 10/2006 | Buscema | |
| 2007/0017996 | A1 | 1/2007 | Xia et al. | |
| 2007/0179966 | A1 | 8/2007 | Li et al. | |
| 2009/0281981 | A1 | 11/2009 | Chen et al. | |
| 2014/0172753 | A1 | 6/2014 | Nowozin | |
| 2015/0278635 | A1 | 10/2015 | Poggio et al. | |
| 2015/0310044 | A1 | 10/2015 | Isaacson et al. | |
| 2017/0022822 | A1 | 1/2017 | Taffet et al. | |
| 2017/0126627 | A1 | 5/2017 | Yang | |
| 2017/0228224 | A1 | 8/2017 | Dunn et al. | |
| 2018/0032870 | A1 | 2/2018 | Liu | |
| 2018/0082172 | A1 | 3/2018 | Patel et al. | |
| 2018/0306609 | A1 | 10/2018 | Agarwal | |
| 2019/0026489 | A1 | 1/2019 | Nerurkar | |
| 2019/0057356 | A1 | 2/2019 | Larsen | |
| 2019/0188000 | A1 | 6/2019 | Chen | |
| 2019/0318104 | A1 | 10/2019 | Yoshino | |
| 2019/0347327 | A1 | 11/2019 | Patil | |
| 2020/0073953 | A1 | 3/2020 | Kulkarni | |

OTHER PUBLICATIONS

Haridas, Harisanker "Deep Neural Network implemented in pure SQL over BigQuery". Towards DataScience [Published Mar. 2018] [Retrieved Apr. 2022] <URL: https://towardsdatascience.com/deep-neural-network-implemented-in-pure-sql-over-bigquery-f3ed245814d3> (Year: 2018).*

Carlile, Brad et al. "Columnar Database Techniques for Creating AI Features" arXiv [Published 2017] [Retrieved Apr. 2022] <URL: https://arxiv.org/abs/1712.02882> (Year: 2017).*

M. S. Razlighi, M. Imani, F. Koushanfar and T. Rosing, "LookNN: Neural network with no multiplication," Design, Automation & Test in Europe Conference & Exhibition (Date), 2017, 2017, pp. 1775-1780, doi: 10.23919/DATE.2017.7927280. (Year: 2017).*

Sergio Fernandes and Jorge Bernardino. 2015. What is BigQuery? In <i>Proceedings of the 19th International Database Engineering Applications Symposium</i> (<i>Ideas '15</i>). Association for Computing Machinery, New York, NY, USA, 202-203. DOI:https://doi.org/10.1145/2790755.2790797 (Year: 2015).*

Bagherinezhad, Hessam et al. "LCNN: Lookup-based Convolutional Neural Network" arXiv [Published 2017] [Retrieved Apr. 2022] < URL: https://arxiv.org/abs/1611.06473> (Year: 2017).*

SQL Server Team, "How six lines of code + SQL Server can bring Deep Learning to Any App", 2017, Microsoft, retrieved from https://www.microsoft.com/en-us/sql-server/blog/2017/01/05/how-six-lines-of-code-sql-server-can-bring-deep-learning-to-any-app/ on Jun. 20, 2024 (Year: 2017).*

Canali, Luca, "How to Build a Neural Network Scoring Engine in PL/SQL", 2016, retrieved from https://externaltable.blogspot.com/2016/07/a-neural-network-scoring-engine-in-plsql.html on Jun. 20, 2024 (Year: 2016).*

Shevchuk, Yurii, "Neural Networks in MySQL", 2016, retrieved from http://blog.itdxer.com/2016/07/01/neural-networs-in-mysql.html on Jun. 20, 2024 (Year: 2016).*

Kahng et al., "ActiVis: Visual Exploration of Industry-Scale Deep Neural Network Models", Jan. 1, 2018, IEEE Transactions on Visualization and Computer Graphics, vol. 24, pp. 88-97 (Year: 2018).*

Chen, "Design of Resistive Synaptic Devices and Array Architectures for Neuromorphic Computing", May 2018, Arizona State University (Year: 2018).*

Kim et al., "Input-Splitting of Large Neural Networks for Power-Efficient Accelerator with Resistive Crossbar Memory Array", Jul. 23, 2018, ISLPED '18: Proceedings of the International Symposium on Low Power Electronics and Design, vol. 2018, pp. 1-6 (Year: 2018).*

Gao et al., "Fully parallel write/read in resistive synaptic array for accelerating on-chip learning", 2015, Nanotechnology, vol. 26, pp. 1-9 (Year: 2015).*

Kara et al., "ColumnML: column-store machine learning with on-the-fly data transformation", Dec. 1, 2018, Proceedings of the VLDB Endowment, vol. 12 No. 4, pp. 348-361 (Year: 2018).*

Imani et al., "RapidNN: In-Memory Deep Neural Network Acceleration Framework", Aug. 9, 2018, arXiv, v3, pp. 1-14 (Year: 2018).*

International Seach Report and Written Opinion for International Application No. PCT/US2019/064550, filed Dec. 4, 2019, mailed Feb. 12, 2020.

International Search Report and Written Opinion for International Application No. PCT/US2019/064552, filed Dec. 4, 2019, mailed Mar. 17, 2020.

Von Hacht, August, "Implementation of Deep Feedforward Neural Network with CUDA Backend for Efficient and Accurate Natural Image Classification," Department of Physics, Chalmers University of Technology, 69 pp, Jun. 2017.

International Preliminary Report on Patentability for PCT/US2019/064552, dated m Jun. 2021.

Dabbura, Imad, "Coding Neural Network—Forward Propagation and Backpropagtion," https://towardsdatascience.com,coding-neural-network-forward-propagation-and-backpropagtion-ccf8cf369f76, 19 pp, Mar. 31, 2018.

Intemational Seach Report and Written Opinion for International Application No. PCT/US2019/064550, filed Dec. 4, 2019, mailed Feb. 12, 2020.

Von Hach!, August, "Implementation of Deep Feedforward Neural Network with Cuda Backend for Efficient and Accurate Natural Image Classification," Department of Physics, Chalmers University of Technology, 69 pp, Jun. 2017.

Search Report and The Written Opinion of corresponding PCT Application Serial No. PCT /US 19/64552, mailed Mar. 17, 2020.

Bentayeb, Fadila, and Jerome Darmont. "Decision tree modeling with relational views." International Symposium on Methodologies for Intelligent Systems. Springer, Berlin, Heidelberg, 2002. (Year: 2002).

Chen, Engu, and Xin James He. "Crude oil price prediction with decision tree based regression approach." Journal of International Technology and Information Management27.4 (2019): 2-16. (Year: 2019).

Sugumaran, V., and K. I. Ramachandran. "Effect of number of features on classification of roller bearing faults using SVM and PSVM." Expert Systems with Applications 38.4 (2011): 4088-4096. (Year: 2011).

Doyle, Michelle, and Padraig Cunningham. "A dynamic approach to reducing dialog in on-line decision guides." European Workshop on Advances in Case-Based Reasoning. Springer, Berlin, Heidelberg, 2000. (Year: 2000).

McClean, Sally I. "Data mining and knowledge discovery." (2003): 229-246. (Year: 2003).

Zaklouta, Fatin, and Bogdan Stanciulescu. "Real-time traffic-sign recognition using tree classifiers." IEEE Transactions on Intelligent Transportation Systems 13.4 (2012): 1507-1514. (Year: 2012).

Basak, Jayanta, and Raghu Krishnapuram. "Interpretable hierarchical clustering by constructing an unsupervised decision tree." IEEE transactions on knowledge and data engineering 17.1 (2005): 121-132. (Year: 2005).

* cited by examiner

EXECUTION OF TRAINED NEURAL NETWORKS USING A DATABASE SYSTEM

FIELD OF THE DISCLOSURE

One technical field of the disclosure is distributed computer systems that are programmed or configured to execute a trained neural network. Another technical field is databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Neural networks provide a solution to the difficulties of solving complex problems. Neural networks generally contain set algorithms and a plurality of weight values. The weight values are multiplied by the algorithms and any input data to generate a result. As a neural network is trained, the weights are adjusted so that the computations performed with training data yield the correct results. Neural networks have found utility in various kinds of data analysis systems, voice recognition, document recognition, image recognition, recommendations systems and other applications of artificial intelligence.

A major benefit of neural networks is that they effectively learn inherent patterns of different datasets. Thus, the programmer does not have to know the correct algorithm prior to programming the neural network for the neural network to provide an accurate result. Additionally, the fact that the neural network picks up patterns in existing data allows the neural network to provide solutions for problems that had not been considered prior to programming of the neural network.

While neural networks provide a large benefit in solving complex problems, they do so at a high computational cost. Both the training of the neural network and the processing of data through a neural network requires a large amount of power and memory. The required calculations consume significant time and processing power. For example, after a neural network is trained, the neural network is tested by providing sets of training input to the trained neural network. The output generated by the trained neural network is compared to the corresponding sets of training output. Typically, a large number of sets of training data is used to train the neural network. As such, merely testing the trained neural network using the training data requires a significant amount of time as well as processing power.

Thus, there is a need for a technique that reduces computational cost of processing data using the neural network.

SUMMARY

The appended claims may serve as a summary of the disclosure.

DETAILED DESCRIPTION

Figure 1:
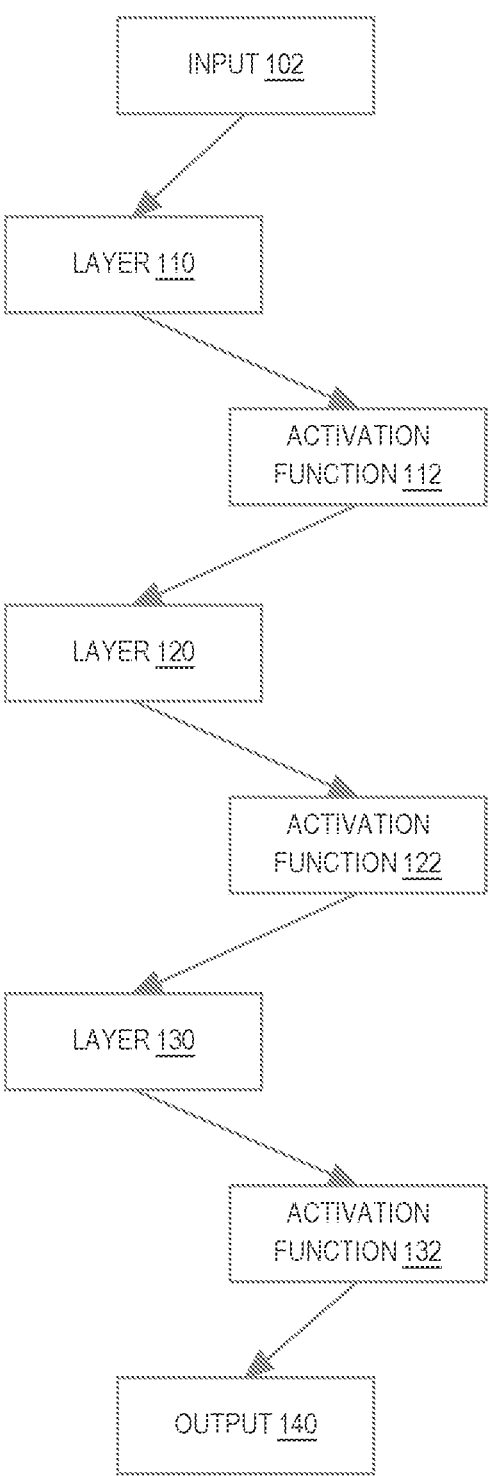
FIG. 1 is a block diagram illustrating an example neural network, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are disclosed in sections according to the following outline:

1. GENERAL OVERVIEW
2. NEURAL NETWORK OVERVIEW
3. OVERVIEW OF EXAMPLE EMBODIMENTS
   3.1 NEURAL NETWORK
   3.2 NEURAL NETWORK QUERIES
   3.3 DATA ENGINE
   3.4 DATA STORE
   3.5 APPLICATION PROGRAM
4. PROCESS OVERVIEW
5. HARDWARE OVERVIEW

1. General Overview

Techniques are described herein for execution of a trained neural network using a database system. In an embodiment, the trained neural network comprises a plurality of layers, each comprising weight values and bias values, and each layer is programmed to execute an affine transformation on a set of input values and an activation function. For a particular layer of the trained neural network, the affine transformation is divided into one or more transformation pieces. In an embodiment, each transformation piece comprises a database query. Each transformation piece is executed to result in computed pieces, and the computed pieces are written to a first database table. Using one or more database queries, the computed pieces are combined, and the activation function is applied to generate a set of output data. The output data is written to one of a plurality of different second database tables that respectively correspond to the layers. The dividing, executing combining, applying, and writing steps are repeated for each layer of the trained neural network.

In an embodiment, executing the one or more transformation pieces and/or executing the one or more queries is performed in parallel.

In an embodiment, a database system configured to execute a trained neural network comprises one or more processors; a database storing data in a columnar format; and a digital electronic memory storing instructions which, when executed using the one or more processors, cause: storing, in the database, one or more sets of input data for the trained neural network; receiving a first set of queries corresponding to a first layer of the trained neural network; executing the first set of queries, based on the one or more sets of input data, to generate a first set of output data corresponding to the first layer; and storing the first set of output data in the database.

In an embodiment, the database system further comprises instructions which, when executed by the one or more processors, cause: receiving a second set of queries corresponding to a second layer of the trained neural network; executing the second set of queries, based on the first set of output data corresponding to the first layer, to generate a second set of output data corresponding to the second layer; and storing the second set of output data in the database.

In an embodiment, the first set of queries and the second set of queries each comprise a respective set of one or more affine transformation queries. The affine transformation queries may be configured to apply the weight values and bias values specified by the first layer and the second layer. Additionally or alternatively, the first set of queries and the second set of queries each comprise a respective set of one or more activation function queries. The activation function queries may apply the activation function specified by the first layer and the second layer.

2. Neural Network Overview

A neural network is a machine learning technique that utilizes a network of learning units, also referred to as neural nodes. The neural nodes are trained to convert an input into corresponding output signals. The neural nodes are arranged in a plurality of layers. Each node receives input from one or more nodes in layers below it and passes output data to one or more nodes in layers above it.

Each neural node may be associated with a weight that is applied to the data it receives to generate output to pass to a subsequent neural node. Each neural node may also be associated with a threshold value, also referred to herein as a bias, wherein output is passed to one or more subsequent nodes if the threshold value is met.

Training a machine learning model comprises providing the machine learning model with a set of training data. The training data comprises a plurality of input data and a plurality of corresponding output data. The machine learning model uses the training inputs and the training outputs to infer a method for correlating the input to the output. Referring to the above example, training the neural network comprises determining a weight and threshold value for each neural node.

FIG. 1 illustrates an example neural network. In the illustrated example, neural network 100 comprises three layers, layer 110, layer 120, and layer 130. In other embodiments, more or fewer layers may be used, and the relationships between layer output and layer inputs may differ based on the embodiment.

In FIG. 1, layer 110 receives input 102. In an embodiment, input 102 comprises a plurality of input values. For example, input 102 may be a vector, array, or other multi-dimensional object. Layer 110 applies one or more weights to each of the input values of the plurality of input values. Additionally, layer 110 applies one or more biases to each of the input values of the plurality of input values. In an embodiment, applying the one or more weights and one or more biases comprises applying an affine transformation corresponding to the one or more weights and biases. An activation function 112 is applied to the result generated by applying the weights and biases of layer 110. The output of activation function 112 is the output for layer 110.

The output from activation function 112, i.e. the output generated at layer 110, is provided as input to layer 114. Layer 120 applies one or more weights to each of its input values. Additionally, layer 120 may apply one or more biases to each of the input values. Activation function 122 is applied to the result generated by applying the weights and biases of layer 120.

Similarly, layer 130 applies one or more weights and one or more biases to the output generated by layer 120, and then applies activation function 132 to the result. The output generated by the activation function 132 is the output of layer 130. In the illustrated example, since layer 130 is the last layer of the neural network 100, the output of layer 130 is the output 140 of the neural network 100.

Thus, each layer of the neural network generates output that is used as input by one or more subsequent layers.

In an embodiment, each layer of a neural network may be represented by a function. For the purpose of illustrating a clear example, assume $L_i$ represents the operation on inputs to the i-th layer of a neural network, while $w_i$ represents the weights and $b_i$ represents the biases of the i-th layer. An example function representing the i-th layer of the neural network may be:

$$L_i(x) := \text{phi}(w_i * x + b_i)$$

where phi( ) corresponds to the activation function of the i-th layer, and $w_i * x + b_i$ corresponds to the affine transformation. Depending on the implementation, the operation may include fewer, additional, or different elements, variables, operations, and/or functions.

As explained in further detail below, a trained neural network may be transformed into one or more queries which are executable by a database system. In an embodiment, the one or more queries correspond to one or more portions of the operation $L_i(x)$ described above.

3. Overview of Example Embodiments

Figure 2:
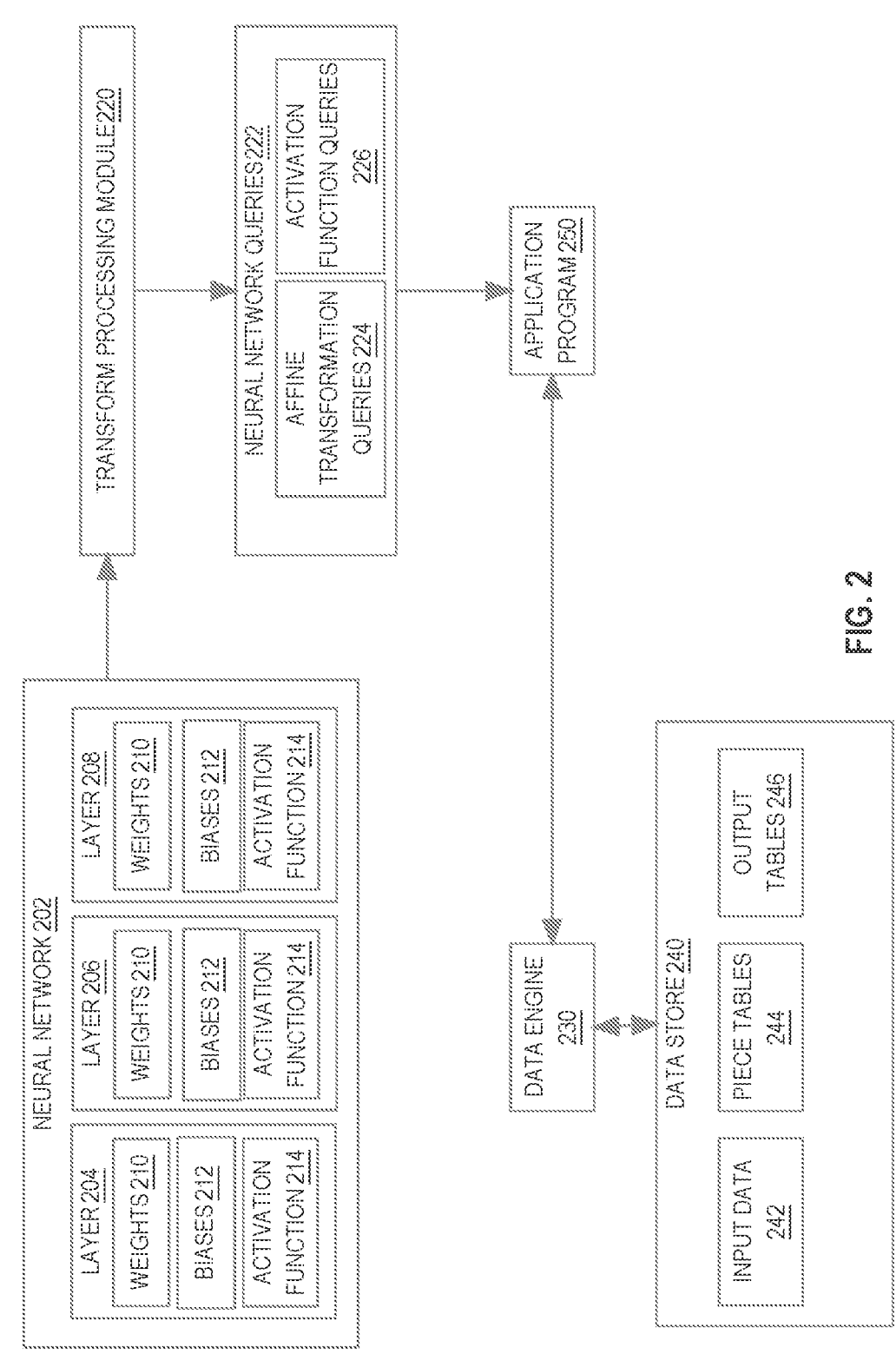
FIG. 2 is a block diagram illustrating an example system in which the techniques described herein may be practiced, according to an embodiment.

In an embodiment, a distributed computer system 200 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 2 illustrates only one of many possible arrangements of components configured to execute the programming described herein. Other arrangements may include fewer or different components, and the division of work between the components may vary depending on the arrangement.

In the example of FIG. 2, system 200 comprises a trained neural network 202, transform processing module 220, data engine 230, data store 240, and application program 250. In an embodiment, each of neural network 202, transform processing module 220, data engine 230, data store 240, and application program 250 are located at or executing on one or more computing devices. Additionally or alternatively, two or more of neural network 202, transform processing module 220, data engine 230, data store 240, and application program 250 may be located at or executing on the same or overlapping sets of one or more computing devices. Example computing devices include, but are not limited to, servers, racks, workstations, personal computers, laptops, wired devices, wireless devices such as mobile phones or tablets, multi-processor systems, and the like. Additionally or alternatively, one or more of neural network 202, transform processing module 220, data engine 230, data store 240, and application program 250 may be located at or executing on one or more virtual computing instances, such as Microsoft Azure, Oracle Cloud, Amazon Elastic Compute Cloud (EC2), or Google Compute Engine instances.

3.1 Neural Network

Neural network 202 is a previously-trained neural network. Neural network 202 may be trained to receive a particular type of input and generate a particular type of output.

As an example, neural network 202 may be trained to determine whether a request to a server computer is a legitimate request. A legitimate request may be from browser of a legitimate user, while an illegitimate request may be from a headless browser or a bot. As an example, a request to a server computer may include a plurality of telemetry information. Telemetry information may comprise data collected from a client computer that describes usages, states, behaviors, measurements, and/or other metrics, statistics, or values that may indicate what a client computer is, and/or is not, doing. The neural network 202 may receive the a of telemetry data and generate output indicating whether, based on the telemetry data, the request is legitimate or illegitimate.

The telemetry information may comprise one or more of: unprocessed data, processed data, or derived data. Unprocessed data comprises raw data collected from the client computer. Processed data may include, for example, converting data into string and/or numeric values, converting data into a standardized format, adding default values for missing attributes, etc. Derived data may be data derived from the collected data. For example, the collected data may include a first timestamp corresponding to a first keypress and a second timestamp corresponding to a second keypress, and the derived data may be a duration calculated based on the first and second timestamps.

In the illustrated embodiment, neural network 202 comprises a plurality of layers, such as layers 204, 206, 208. In other embodiments, neural network 202 may comprise more or fewer layers. Each layer is associated with one or more respective weights 210 and one or more respective biases 212. The weights 210 and the biases 212 are applied by each neural node of the layer to input received by the layer. Additionally, each layer may comprise a respective activation function 214, which is applied to the result obtained after the weights 210 and the biases 212 are applied.

In an embodiment, data is stored, obtained and/or generated that describes neural network 202. The data may include, for example, data describing the arrangement of layers 204, 206, 208; the input expected at each layer 204, 206, 208; values of the one or more weights 210; values of one or more biases 212; how the one or more weights 210 and/or the one or more biases 212 are applied to input data; and the one or more activation functions 214.

3.2 Neural Network Queries

In an embodiment, a transform processing module 220 comprises program instructions that are programmed or configured to receive the data describing neural network 202 and transform the data into one or more queries 222. Based on the retrieved data, one or more corresponding queries are generated.

The one or more queries 222, when executed, cause application of the neural network 102 to a set of input data. The output data generated by the one or more queries 222 corresponds to output data that would be generated if the input data were provided to neural network 202. In an embodiment, the one or more queries 222 correspond to the layers of the neural network 202, such as layers 204, 206, 208. For example, assume layer 204 applies the operation $L_{204}(x)$ to input data, where "x" refers to the input data. The corresponding query, when executed, may cause a set of input data to be read from one or more rows of an input table, the operation $L_{204}(x)$ to be applied to the set of input data, and the output written to one or more rows of an output table.

In FIG. 2, the neural network queries 222 comprise a plurality of affine transformation queries 224 and a plurality of activation function queries 226. Each layer may correspond to one or more particular affine transformation queries 224 and one or more particular activation function queries 226.

In an embodiment, the one or more particular affine transformation queries 224 correspond to the affine transformation applied by the layer. Referring to the above example, assume operation $L_{204}(x)$ includes the affine transformation "$w_{204}*x+b_{204}$". The one or more particular affine transformation queries 224, when executed, may cause a set of input data to be read from one or more rows of an input table, and apply the affine transformation "$w_{204}*x+b_{204}$" to the set of input data. Additionally, the one or more particular affine transformation queries 224 may store the output of the affine transformation in one or more piece tables 244.

In an embodiment, each layer corresponds to a plurality of affine transformation queries 224. An affine transformation may be divided into a plurality of transformation pieces, and each affine transformation query may correspond to a particular piece. Each transformation piece may apply the layer weight to a portion of input data. In an embodiment, an affine transformation query 224 is divided into a plurality of pieces based on a desired query length, input size, and/or any other factors.

Referring to the above example, assume that the set of input "x" comprises M*N inputs. The affine transformation $w_{204}*x+b_{204}$ may be divided into M number of transformation pieces of size N, such that $w_{204\_1}*x_{i\_1}$ applies a first weight to a first input, $w_{204\_2}*x_{i\_2}$ applies a second weight to a second input, and so on.

A set of example transformation piece may be:

$$\text{Piece 1: } w_{204\_1}*x_{i\_1} + w_{204\_2}*x_{i\_2} + \dots w_{204\_N}*x\_N$$

$$\text{Piece 2: } w_{204\_N+1}*x_{i\_N+1} + w_{204\_N+2}*x_{i\_N+2} + \dots w_{204\_2N}*x\_{2N}$$

$$\dots$$

$$\text{Piece } M: \dots + w_{204\_M-2}*x\_{M-1} + w_{204\_M}*x\_M$$

$$\text{Final Piece: } b_{204}$$

A first affine transformation query may apply transformation piece 1, a second affine transformation query may apply transformation piece 2, and etc. Each affine transformation query may store the piece results in a piece table 244. In an embodiment, the affine transformation queries each store piece results in a piece table 244 corresponding to the particular layer. In other embodiments, each affine transformation query stores piece results to a separate piece table 244.

In an embodiment, the one or more particular activation function queries 226 correspond to the activation function applied by the layer. The one or more activation function queries may read the affine transformation results from one or more results table, such as piece table(s) 244, and apply the activation function to the result. If the affine transformation results are stored in a plurality of pieces, then the one or more activation function queries may combine the plurality of pieces and apply the activation function to the combined result. Additionally, the output after the activation function is applied may be stored in an output table 246 corresponding to the layer.

Referring to the above example, assume operation $L_{204}(x)$ applies an activation function "phi", and the affine transformation queries 224 generated piece results p1, p2, p3, etc. The one or more particular activation function queries 226, when executed, may cause p1, p2, p3, etc. to be read from one or more piece tables 244, combine the pieces p1, p2, p3, etc. and apply the activation function "phi." An example activation function query may be:

$$\mathrm{phi}(p1{+}p2{+}p3{+}\ldots)$$

In the above example, a single activation function query both combines the pieces and applies the activation function. Alternatively, one or more activation function queries may combine the pieces p1, p2, p3, etc. and a different activation function query may apply the activation function.

In an embodiment, in response to receiving data describing neural network 202, the transform processing module 220 determines the operation $L_i$ to be applied at each layer and generates one or more queries 222 that apply the operation to data read from a database. In an embodiment, determining the operation $L_i$ comprises determining the affine transformation based on data describing the weights and biases of the layer, and determining the activation function based on data describing the activation function. In other embodiments, the data describing neural network 202 specifies the operation $L_i$. Transform processing module 220 may be programmed or configured to convert the operation into a query language format. For example, transform processing module 220 may receive or store one or more SQL statement templates with tokens that can be replaced with values, such as weight values, signal names, or column names.

Additionally or alternatively, the one or more queries 222 may be received by system 200. For example, the one or more queries 222 may be defined by a user through command line or graphical user interface input, retrieved from one or more files stored by or accessible to system 200, or received from one or more applications or programs, such as application program 250.

3.3 Data Engine

In the embodiment illustrated by FIG. 1, application programs interact with data stored in data store 240 via data engine 230. Data engine 230 may be programmed or configured to perform a variety of functions needed for processing requests for data including, but not limited to: receiving queries from application program 250, executing queries, retrieving data from data store 240, storing data to data store 240, translating retrieved data into a requested format, sending query results to application program 250, and any other aspects of embodiments described herein.

Additionally or alternatively, data engine 230 provides an API that may be accessed, for example, by application program 250, to perform the functions related to processing data requests.

In an embodiment, data engine 230 comprises a plurality of computing instances for processing requests. In response to receiving a request, data engine 230 selects one or more computing instances of the plurality to process the request.

For example, in response to receiving a plurality of affine transformation queries 224, data engine 230 may execute the plurality of queries in parallel using a plurality of computing instances. Additionally or alternatively, each affine transformation query of the plurality of affine transformation queries 224 may be executed using a plurality of computing instances. By executing a plurality of affine transformation queries in parallel, the results of applying the affine transformation to a set of input may be determined more quickly compared to typical approaches that apply a weight to each input, combine the results, apply the biases, etc.

Additionally or alternatively, data engine 230 may be programmed or configured to optimize query execution based on the requests received and/or the data stored at data store 240. For example, in response to receiving a plurality of affine transformation queries 224, data engine 230 may generate an execution plan that optimizes execution of the plurality of affine transformation queries 224.

3.4 Data Store

In an embodiment, the data store 240 is a data storage subsystem consisting of programs and data that is stored on any suitable storage device such as one or more hard disk drives, memories, or any other electronic digital data recording device configured to store data. Although data storage system 240 is depicted as a single device in FIG. 1, data storage system 240 may span multiple devices located in one or more physical locations. In an embodiment, data storage system 240 is a distributed file system or a distributed data store comprising a plurality of data nodes. For example, data storage system 240 may be a Google Cloud Storage System, Hadoop Distributed File System (HDFS), MapR File System (MapR FS), HBase, or other suitable distributed data store.

In an embodiment, data store 240 stores data in a column-oriented storage format. Example column-oriented data storage formats include Capacitor, Parquet, Kudu, and Object Relational Columnar (ORC). The particular data storage format may vary depending on the implementation.

Generally, data store 240 stores data related to executing neural network 202 using a database system including, but not limited to, input data 242, one or more piece tables 244, and one or more layer output tables 246.

Input data 242 comprises one or more input sets for neural network 202. For example, the input data 242 may comprise a plurality of test input sets for testing the trained neural network 202.

In an embodiment, the input data 242 is stored in columnar format. Each row may correspond to a particular input set, and each column may correspond to a particular element of the input set. For example, assume input to the neural network comprises a vector, <v1, v2, v3 . . . >. The vector may be stored in a particular row such that the value in column 1 is "v1," the value in column 2 is "v2," etc.

One benefit of storing an input set in columnar format is that calculations may be performed for each input in parallel. Referring to the above example, assume the input set comprises a large number of vectors, where each input is stored in a respective column. The columns may be processed in parallel with one another. This results in significantly faster computation compared to processing each input at a time for an input set.

An additional benefit is that a database system is able to index the data stored in each column. For searching on a single field, only the column associated with the field needs to be loaded, and the indexing allows searching to be performed faster. Additionally, the database system may divide the columns into chunks. This allows the database system to identify which chunks are relevant for a computation and only operate on relevant chunks. The database system may also compress computations when performing calculations for each column. For example, if the cardinality of a column is low, that is if a column does not have many different values or many rows share the same values in a particular column, then a calculation may be performed just a single time for the rows.

Additionally or alternatively, the data store 240 may be communicatively connected with other components, either directly or indirectly, such as one or more third party data suppliers, application program 250, or other computing devices. Data store 240 may be configured to receive or retrieve input data 242 from the one or more third party data suppliers, application program 250, and/or other computing devices.

Piece tables 244 store results generated by the one or more affine transformation queries 224. In an embodiment, each piece table corresponds to a particular layer of the neural network. One or more affine transformation queries 224 store query results in the corresponding piece table. In other embodiments, each affine transformation query 224 stores query results in a separate corresponding piece table.

In an embodiment, piece tables 244 are temporary tables. The temporary tables may kept only for the duration of executing the neural network queries 222. In an embodiment, piece tables 244 are temporarily stored in data store 240. Additionally or alternatively, the piece tables 244 may be stored in memory of one or more computing devices, such as memory of data engine 230.

Layer output tables 246 store results generated by each layer of the neural network. In an embodiment, the results generated by activation function queries 226 are stored to a corresponding layer output table 246. For example, the activation function query corresponding to layer 204 may generate and store output to a layer output table corresponding to layer 204. The data stored in the layer output table 246 corresponding to the final layer of the neural network 202 may be stored as the output of the neural network 202. Additionally or alternatively, the data stored in the layer output table 246 corresponding to the final layer of the neural network 202 may be provided to an application, such as application program 140, as output of the neural network 202.

3.5 Application Program

In an embodiment, application program 250 is an interface, endpoint, application and/or service that is configured or programmed to provide input to data engine 230 and receive a set of output generated by data engine 230. In an embodiment, output data generated by data engine 230 may be stored in a data file accessible by application program 250. Example data files include JSON, comma separated values, SQL dump, spreadsheet files, and other file types. Additionally or alternatively, the set of output results may be displayed at a display device using, for example, a command line interface or a graphical user interface of application program 250.

As an example, application program 250 may be a browser displaying a web-based user interface for interacting with data engine 230. As another example, application program 250 may be an application programmed or configured to communicate with data engine 230 using a client library and/or an API.

In some embodiments, application program 250 may be programmed or configured to receive user input specifying one or more queries. Additionally or alternatively, application program 250 may be programmed or configured to retrieve one or more stored queries. The queries may have been previously generated at system 200, for example by transform processing module 220, and correspond to neural network 102.

4. Process Overview

Figure 3:
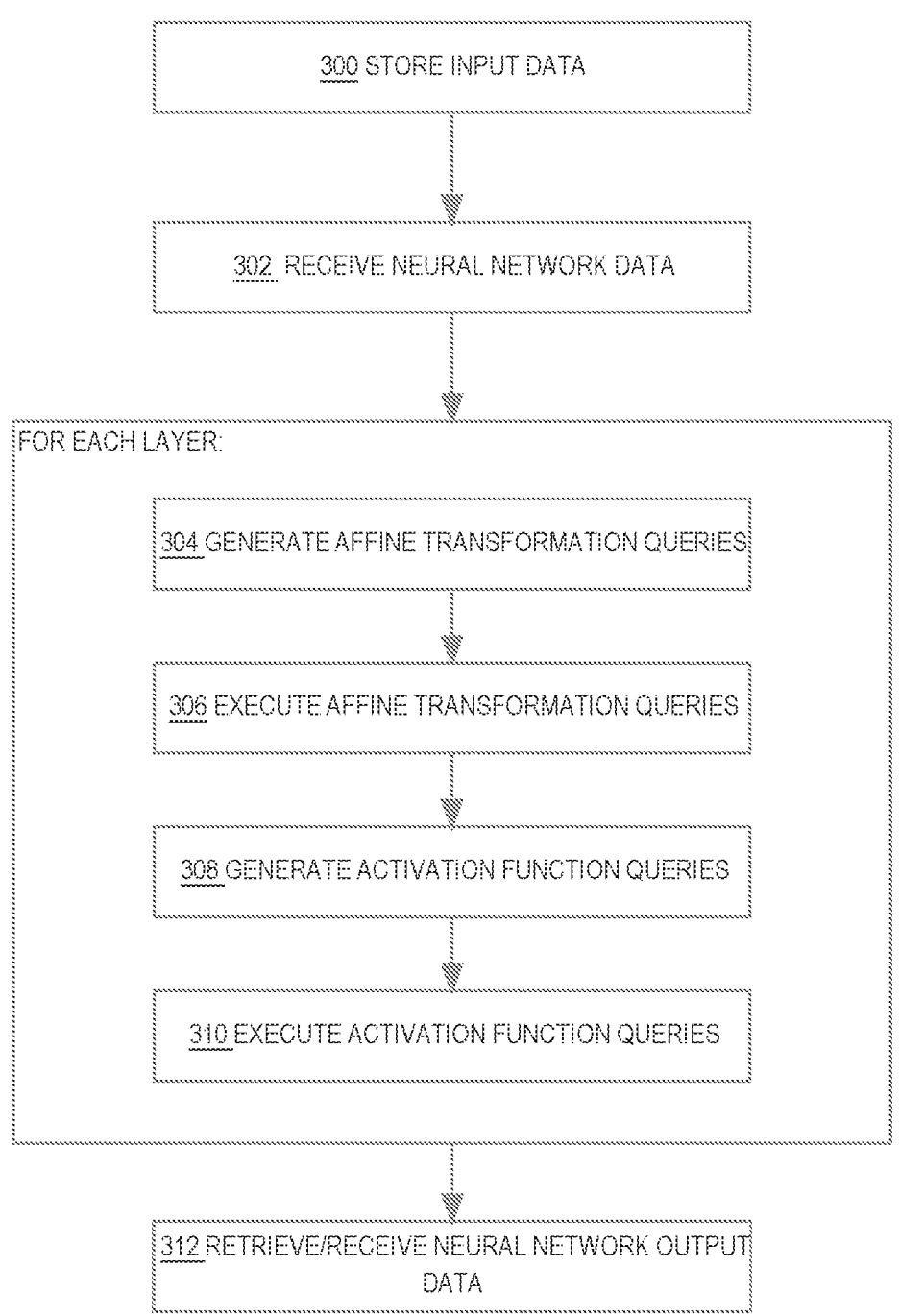
FIG. 3 is a block diagram illustrating an example neural network execution process, according to an embodiment.

FIG. 3 illustrates example steps for using a database system to apply a trained neural network.

Although the steps in FIG. 3 are shown in an order, the steps of FIG. 3 may be performed in any order, and are not limited to the order shown in FIG. 3. Additionally, some steps may be optional, may be performed multiple times, and/or may be performed by different components.

At step 300, input data for the neural network is stored. For example, application program 250 may provide input data to data engine 230. Data engine 230 stores the input data to input data 242 in data store 240. In an embodiment, the input data comprises a plurality of input sets. The input data may be divided based on the plurality of input sets, and each input set may be stored separately. Additionally or alternatively, each input set may be stored as a column of a database table.

At step 302, data corresponding to the trained neural network is generated or received. As an example, data corresponding to neural network 202 may be generated by neural network 202 and provided to transform processing module 220. The data may describe, for example, the arrangement of layers 204, 206, and 208; the input expected by each layer 204, 206, and 208; values of the one or more weights 210; values of one or more biases 212; how the one or more weights 210 and/or the one or more biases 212 are applied to input data; and the one or more activation functions 214.

At step 304, for a first layer of the neural network, one or more affine transformation queries are generated based on the neural network data. In an embodiment, a single affine transformation query is generated for each layer of the neural network. Referring to the above example, a first affine transformation query may be generated for layer 204, a second affine transformation query may be generated for layer 206, and a third affine transformation query may be generated for layer 208.

In other embodiments, the affine transformation of each layer is divided into a plurality of affine transformation pieces. An affine transformation query may be generated for each affine transformation piece. Referring to the above example, the affine transformation for layer 204 may be divided into a plurality of affine transformation pieces. A corresponding plurality of affine transformation queries are generated for the plurality of affine transformation pieces.

At step 306, for the first layer of the neural network, each affine transformation query of the one or more affine transformation queries are executed. In an embodiment, the affine transformation queries for the first layer read or retrieve input data from input data 242. Additionally, subsequent layers may read or retrieve output data generated by previous layers from layer output tables 246 and/or from input data 242, depending on the implementation.

The results of the one or more affine transformation queries are written to one or more piece tables, such as piece tables 244. In an embodiment, the one or more affine transformation queries store results to the same piece table

244. In other embodiments, each affine transformation query stores results to a different piece table 244.

For the purpose of illustrating a clear example, assume a plurality of affine transformation queries are generated, corresponding to a plurality of affine transformation pieces. The results corresponding to each affine transformation piece may be stored in a corresponding piece table 244.

At step 308, for the first layer of the neural network, one or more activation function queries are generated. In an embodiment, the results of the one or more affine transformation queries are stored in a single piece table. An activation function may be generated that applies the activation function to the results stored in the single piece table. In an embodiment, the results of the one or more affine transformation queries are stored in a plurality of piece tables. One or more activation function queries may be generated that combine the results from the plurality of piece tables into a single result, and applies the activation function to the combined result.

At step 310, for the first layer of the neural network, the one or more activation function queries are executed. In an embodiment, the results of one or more affine transformation queries are stored to a single piece table. The results are read or retrieved from the piece table and the activation function is applied. In an embodiment, the results of the one or more affine transformation queries are stored in a plurality of piece tables. The results are read or retrieved from each piece table of the plurality of piece tables, combined to generate a combined, and the activation function applied to the combined result. The results are written to a corresponding layer output table.

The above steps 304-310 are repeated for each layer of the neural network.

In some embodiments, rather than generating the one or more affine transformation queries and/or the one or more activation function queries, the one or more affine transformation queries and/or the one or more activation function queries may be received or retrieved. For example, application program 250 may send the one or more affine transformation queries and/or the one or more activation function queries to query engine 230.

At step 312, the output generated by the neural network is retrieved and/or received. In an embodiment, the output may be stored in one or more data files that may be sent to or accessible by a computing device executing application program 250. Example data files include JSON, comma separate values, SQL dumps, spreadsheets such as Excel files, and other file types. Additionally or alternatively, the output may be displayed to a user of an application or program, such as application program 250. For example, the output may be displayed using a command line interface or a graphical user interface of application program 250.

5. Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
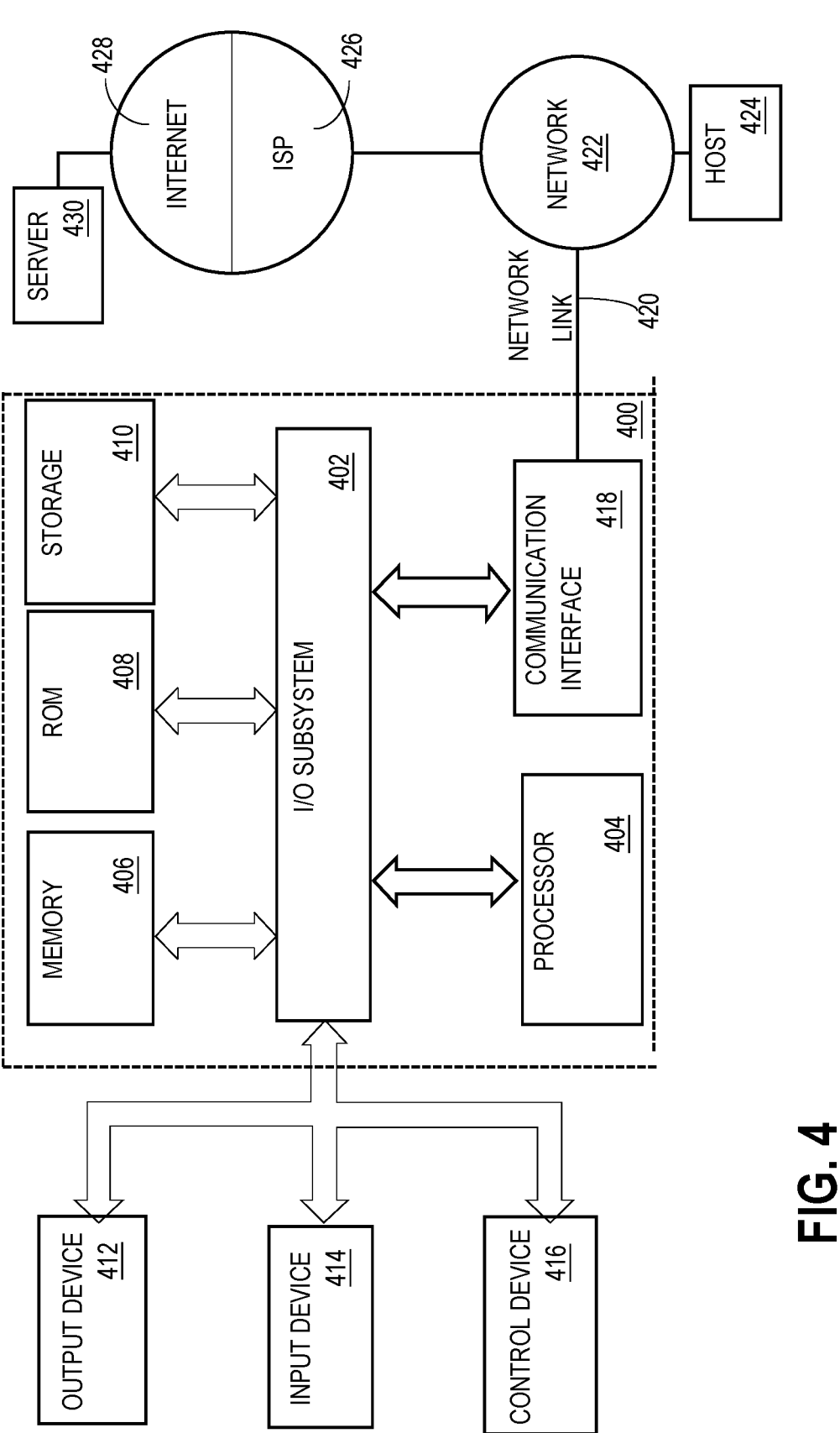
FIG. 4 is a block diagram that illustrates a computer system upon which an embodiment of the invention may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method implemented by one or more computer systems, server devices, or client devices, the method for efficient execution of a trained neural network using a database system, the trained neural network comprising a plurality of layers each comprising a plurality of weight values and bias values and programmed at each of the layers to execute an affine transformation of an activation function and input data, the method comprising:

executing the trained neural network based on the input data as follows, the input data being stored in the database system in columnar format comprising one or more rows and one or more columns, wherein each of the one or more rows corresponds to a respective input set, and each of the one or more columns corresponds to a respective element of the respective input set, at a first layer of the trained neural network:

dividing the affine transformation into a plurality of transformation pieces based on one or more predetermined factors, to generate one or more affine transformation queries for each transformation piece, each of the transformation pieces applying one of the plurality of weight values to a portion of the input data, the one or more predetermined factors comprising a desired query length;

executing the generated one or more affine transformation queries in parallel by applying an operation to each of the one or more columns in parallel to obtain computed pieces, and writing the computed pieces to a first temporary database table of the database system;

generating one or more activation function queries to combine the computed pieces and applying the activation function to the combined computed pieces to generate a set of output data; and writing, in columnar format, the output data to one of a plurality of different second database tables of the database system that respectively correspond to the layers, and subsequently deleting the first temporary database table;

at each subsequent layer of the trained neural network, using the output data of one or more previous layers as input data and repeating the dividing, executing, combining, applying, and writing operations; and displaying the output data via a user interface of an application program.

2. The method of claim 1 further comprising:

before the other steps of claim 1, programmatically receiving the input data from the application program; and after the steps of claim 1, programmatically providing the output data to the application program.

3. A network traffic manager apparatus for efficient execution of a trained neural network, the trained neural network comprising a plurality of layers each comprising a plurality of weight values and bias values and programmed at each of the layers to execute an affine transformation of an activation function and an input data, the network traffic manager apparatus, comprising a database and a memory, the memory comprising programmed instructions stored in the memory and one or more processors configured to be capable of executing the programmed instructions stored in the memory to:

execute, with the one or more processors, the trained neural network based on the input data as follows, the input data being stored in the database in columnar format comprising one or more rows and one or more columns, wherein each of the one or more rows corresponds to a respective input set, and each of the one or more columns corresponds to a respective element of the respective input set, at a first layer of the trained neural network:

divide the affine transformation into a plurality of transformation pieces based on one or more predetermined factors, to generate one or more affine transformation queries for each transformation piece, each of the transformation pieces applying one of the plurality of weight values to a portion of the input data, the one or more predetermined factors comprising a desired query length;

execute the generated one or more affine transformation queries in parallel by applying an operation to each of the one or more columns in parallel to obtain computed pieces, and write the computed pieces to a first temporary database table of the database;

generate one or more activation function queries to combine the computed pieces and apply the activation function to the combined computed pieces to generate a set of output data;

write, in columnar format, the output data to one of a plurality of different second database tables of the database that respectively correspond to the layers, and subsequently delete the first temporary database table;

at each subsequent layer of the trained neural network, use the output data of one or more previous layers as input data and repeat the divide, execute, combine, apply, and write operations; and display the output data via a user interface of an application program.

4. The apparatus of claim 3, wherein the one or more processors are further configured to be capable of executing the programmed instructions stored in the memory to:

before the other steps of claim 3, programmatically receive the input value from the application program; and after the steps of claim 3, programmatically provide the output data to the application program.

5. The apparatus of claim 3 wherein the database is a columnar data store.

6. A database system configured to execute a trained neural network, the trained neural network comprising a plurality of layers each comprising a plurality of weight values and bias values and programmed at each of the layers to execute an affine transformation of an activation function and input data, the database system comprising traffic management apparatuses, client devices, or server devices, the database system comprising memory comprising programmed instructions stored thereon and processors configured to be capable of executing the stored programmed instructions to:

execute, with the processors, the trained neural network based on the input data as follows, the input data being stored in the database system in columnar format comprising one or more rows and one or more columns, wherein each of the one or more rows corresponds to a respective input set, and each of the one or more columns corresponds to a respective element of the respective input set, at a first layer of the trained neural network:

divide the affine transformation into a plurality of transformation pieces based on one or more predetermined factors, to generate one or more affine transformation queries for each transformation piece, each of the transformation pieces applying one of the plurality of weight values to a portion of the input data, the one or more predetermined factors comprising a desired query length;

execute the generated one or more affine transformation queries in parallel by applying an operation to each of the one or more columns in parallel to obtain computed pieces, and write the computed pieces to a first temporary database table of the database system;

generate one or more activation function queries to combine the computed pieces and apply the activation function to the combined computed pieces to generate a set of output data;

write, in columnar format, the output data to one of a plurality of different second database tables of the database system that respectively correspond to the layers, and subsequently delete the first temporary database table;

at each subsequent layer of the trained neural network, use the output data of one or more previous layers as input data and repeat divide, execute, combine, apply, and write operations; and display the output data via a user interface of an application program.

7. The database system of claim 6 wherein the processors are further configured to be capable of executing the programmed instructions stored in the memory to:

before the other steps of claim 6, programmatically receive the input data from the application program; and after the steps of claim 6, programmatically provide the output data to the application program.

8. The database system of claim 6 wherein the database is a columnar data store.

9. A non-transitory computer readable medium having stored thereon instructions for efficient execution of a trained neural network, the trained neural network comprising a plurality of layers each comprising a plurality of weight values and bias values and programmed at each of the layers to execute an affine transformation of an activation function and input data, comprising executable code which when executed by processors, causes the processors to:

execute, with the processors, the trained neural network based on the input data as follows, the input data being stored in a database system in columnar format comprising one or more rows and one or more columns, wherein each of the one or more rows corresponds to a respective input set, and each of the one or more columns corresponds to a respective element of the respective input set, at a first layer of the trained neural network:

divide the affine transformation into a plurality of transformation pieces based on one or more predetermined factors, to generate one or more affine transformation queries for each transformation piece, each of the transformation pieces applying one of the plurality of weight values to a portion of the input data, the one or more predetermined factors comprising a desired query length;

execute the generated one or more affine transformation queries in parallel by applying an operation to each of the one or more columns in parallel to obtain computed pieces, and writing the computed pieces to a first temporary database table of the database;

generate one or more activation function queries to combine the computed pieces and apply the activation function to the combined computed pieces to generate a set of output data;

write, in columnar format, the output data to one of a plurality of different second database tables of the database that respectively correspond to the layers, and subsequently delete the first temporary database table;

at each subsequent layer of the trained neural network, use the output data of one or more previous layers as input data and repeat divide, execute, combine, apply, and write operations; and display the output data via a user interface of an application program.

10. The medium of claim 9, wherein the executable code which when executed by the processors, further causes the processors to:

before the other steps of claim 9, programmatically receive the input data from the application program; and after the steps of claim 9, programmatically provide the output data to the application program.

11. The medium of claim 9, wherein the database is a columnar data store.

12. The method of claim 1, wherein generating the one or more activation function queries to combine the computed pieces comprises generating the one or more activation function queries to combine the computed pieces into a single result and applying the activation function to the combined single result to generate the set of output data.

13. The method of claim 1, wherein the first temporary database table is kept for a duration of executing the one or more affine transformation queries.

14. The method of claim 1, wherein executing the generated one or more affine transformation queries in parallel comprises generating an execution plan that optimizes the execution of the one or more affine transformation queries.

15. The method of claim 1, wherein the one or more predetermined factors comprising an input size.

16. The apparatus of claim 3, wherein the first temporary database table is kept for a duration of executing the one or more affine transformation queries.

17. The apparatus of claim 3, wherein execute the generated one or more affine transformation queries in parallel comprises generate an execution plan that optimizes the execution of the one or more affine transformation queries.

18. The database system of claim 6, wherein the first temporary database table is kept for a duration of executing the one or more affine transformation queries.

19. The database system of claim 6, wherein execute the generated one or more affine transformation queries in parallel comprises generate an execution plan that optimizes the execution of the one or more affine transformation queries.

20. The medium of claim 9, wherein the first temporary database table is kept for a duration of executing the one or more affine transformation queries.

* * * * *